(12) United States Patent
Wang et al.

(10) Patent No.: US 10,558,891 B2
(45) Date of Patent: Feb. 11, 2020

(54) SYSTEMS AND METHODS FOR OBJECT TRACKING

(71) Applicant: Beijing SenseTime Technology Development Co., Ltd, Beijing (CN)

(72) Inventors: Xiaogang Wang, Hong Kong (CN); Lijun Wang, Dalian (CN); Wanli Ouyang, Shatin (CN); Huchuan Lu, Dalian (CN)

(73) Assignee: Beijing SenseTime Technology Development Co., Ltd., Beijing (CN)

( * ) Notice: Subject to any disclaimer, the term of this patent is extended or adjusted under 35 U.S.C. 154(b) by 262 days.

(21) Appl. No.: 15/882,770

(22) Filed: Jan. 29, 2018

(65) Prior Publication Data

US 2018/0165548 A1    Jun. 14, 2018

Related U.S. Application Data (63) Continuation of application No. PCT/CN2015/085528, filed on Jul. 30, 2015.

(51) Int. Cl.
*G06K 9/62* (2006.01)
*G06T 7/246* (2017.01)
(Continued)

(52) U.S. Cl.
CPC .............. *G06K 9/6256* (2013.01); *G06K 9/03* (2013.01); *G06K 9/2054* (2013.01);
(Continued)

(58) Field of Classification Search
CPC ........... G06T 7/20; G06T 7/246; G06T 7/248; G06T 7/251; G06T 2207/20084;
(Continued)

(56) References Cited

U.S. PATENT DOCUMENTS

| 2010/0110183 | A1  | 5/2010  | Bobbitt et al. |
|---|---|---|---|
| 2016/0171346 | A1* | 6/2016  | Han .......................... G06K 9/66 382/103 |
| 2017/0351936 | A1* | 12/2017 | Jiang ....................... G06K 9/60 |

FOREIGN PATENT DOCUMENTS

| CN | 103260081 A | 8/2013 |
|---|---|---|
| CN | 104680508 A | 6/2015 |

OTHER PUBLICATIONS

Wang, Naiyan, et al. "Transferring rich feature hierarchies for robust visual tracking." arXiv preprint arXiv:1501.04587 (2015). (Year: 2015).*

Fan, Jialue, et al. "Human tracking using convolutional neural networks." IEEE Transactions on Neural Networks 21.10 (2010): 1610-1623. (Year: 2010).*

Hong, Seunghoon, et al. "Online Tracking by Learning Discriminative Saliency Map with Convolutional Neural Network." arXiv preprint arXiv:1502.06796 (2015). (Year: 2015).*

Jin, Jonghoon, et al. "Tracking with deep neural networks." 2013 47th Annual Conference on Information Sciences and Systems (CISS). IEEE, 2013. (Year: 2013).*

(Continued)

*Primary Examiner* — Geoffrey E Summers
(74) *Attorney, Agent, or Firm* — Lathrop Gage LLP (57) ABSTRACT

Disclosed are methods for object tracking. In an example, the method comprises: determining a region of interest (ROI) in a first frame of a video sequences; feeding the determined ROI forward through a first CNN (convolutional network) to obtain a plurality of first feature maps in a higher layer of the CNN and a plurality of second feature maps in a lower layer of the first CNN; selecting a plurality of feature maps from the first and second feature maps, respectively; predicting, based on the selected first and second feature maps, two target heat maps indicating a target location for said objects in the current frame, respectively; and estimating, based on the two predicated target heat maps, a final target location for the object in the current frame.

19 Claims, 7 Drawing Sheets

(51) Int. Cl.
*G06N 3/08* (2006.01)
*G06N 3/04* (2006.01)
*G06T 7/73* (2017.01)
*G06K 9/03* (2006.01)
*G06K 9/20* (2006.01)

(52) U.S. Cl.
CPC ......... *G06K 9/6202* (2013.01); *G06N 3/0454* (2013.01); *G06N 3/08* (2013.01); *G06N 3/084* (2013.01); *G06T 7/246* (2017.01); *G06T 7/248* (2017.01); *G06T 7/74* (2017.01); *G06K 2209/21* (2013.01); *G06T 2207/10016* (2013.01); *G06T 2207/20081* (2013.01); *G06T 2207/20084* (2013.01); *G06T 2207/30196* (2013.01)

(58) Field of Classification Search
CPC . G06T 2207/30196; G06T 2207/20081; G06T 2207/10016; G06T 7/74; G06N 3/02–049; G06N 3/08–008; G06K 9/6256; G06K 9/6202; G06K 9/2054; G06K 9/03; G06K 2009/21
USPC .......................................... 382/103, 156–158
See application file for complete search history.

(56) References Cited

OTHER PUBLICATIONS

Li, Hanxi, Yi Li, and Fatih Porikli. "DeepTrack: Learning Discriminative Feature Representations Online for Robust Visual Tracking." arXiv preprint arXiv:1503.00072 (2015). (Year: 2015).*

Nowlan, Steven J., and John C. Platt. "A convolutional neural network hand tracker." Advances in neural information processing systems (1995): 901-908. (Year: 1995).*

Zeiler, Matthew D., and Rob Fergus. "Visualizing and understanding convolutional networks." European conference on computer vision. Springer, Cham, 2014. (Year: 2014).*

Wang, Lijun, et al. "Visual Tracking with Fully Convolutional Networks." 2015 IEEE International Conference on Computer Vision (ICCV). IEEE, 2015. (Year: 2015).*

International Search Report of PCT/CN2015/085528 dated Apr. 27, 2016, 2 pp.

* cited by examiner

SYSTEMS AND METHODS FOR OBJECT TRACKING

CROSS REFERENCE TO RELATED APPLICATION

This application is a continuation of PCT/CN2015/085528, filed on Jul. 30, 2015 and entitled "a system and a method for object tracking", the entire disclosure of which is hereby incorporated by reference.

TECHNICAL FIELD

The disclosures relate to systems for object tracking and methods thereof.

BACKGROUND

Visual tracking, as one of the fundamental problems in computer vision, has found wide applications. Although much progress has been made in the past decade, tremendous challenges still exist in designing a robust tracker that can well handle significant appearance changes, pose variations, severe occlusions, and background clutters.

In order to address these issues, existing appearance based tracking methods adopt either generative or discriminative models to separate the foreground from background and distinct co-occurring objects. One major drawback of these methods is that they rely on low-level hand-crafted features which are incapable to capture semantic information of targets, not robust to significant appearance changes, and only have limited discriminative power.

Driven by the emergence of large-scale visual data sets and fast development of computation power, Deep Neural Networks (DNNs), especially convolutional neural networks (CNNs), with their strong capabilities of learning feature representations, have demonstrated record breaking performance in image classification and object detection. Different from hand-crafted features, features learned by CNNs from massive annotated visual data and a large number of object classes (such as Image Net) carry rich high-level semantic information and are strong at distinguishing objects of different categories. These features have good generalization capability across data sets. Recent studies have also shown that such features are robust to data corruption. Their neuron responses have strong selectiveness on object identities, i.e. for a particular object only a subset of neurons are responded and different objects have different responding neurons.

SUMMARY

In one aspect of the present application, disclosed is a method for object tracking, comprising:

determining a region of interest (ROI) in a first frame of a video sequence, wherein the ROI is centered at a ground truth target location for objects to be tracked;

feeding the determined ROI forward through a first CNN (convolutional neural network) to obtain a plurality of first feature maps in a higher layer of the CNN and a plurality of second feature maps in a lower layer of the first CNN, wherein the first CNN is pre-trained on image classification task such that the first feature maps include more semantic features to determine a category for objects to be tracked in the video sequence, while the second feature maps carry more discriminative information to separate the objects from distracters with similar appearance;

selecting a plurality of feature maps from the first and second feature maps, respectively;

predicting, based on the selected first and second feature maps, two target heat maps indicating a target location for said objects in the first frame, respectively; and estimating, based on the two predicated target heat maps, a final target location for the object in the first frame.

In an embodiment, the plurality of feature maps from the first and second feature maps are selected by two sel-CNNs which are pre-trained with the first feature maps and the second maps respectively; and the training of the sel-CNNs comprises:

initializing the two sel-CNNs with the first feature maps and the second feature maps, respectively, to output a heat map for the objects in each of the sel-CNNs;

comparing the heat map with a ground truth heat map for the objects to obtain a prediction error for each of the sel-CNNs; and back-propagating the error through each of the sel-CNNs until the obtained error is less than a threshold.

In an embodiment, the training further comprises:

determining a significance for each of those in the first and second feature maps according to the two trained sel-CNNs;

ranking those in the first and second feature maps independently in a descending order according to their significance values; and selecting top ranked K feature maps from both higher and lower layers, wherein K is an integer greater than or equal to 1;

wherein at an online tracking stage for following frames, the first and second feature maps are extracted from the higher and lower layers of the first CNN respectively and their corresponding K features maps are selected and serve as said selected first and second feature maps.

In an embodiment, the predicting comprises:

initializing a GNet and a SNet and obtaining target heat maps for the first frame;

estimating, by the initialized GNet and SNet, the target heat maps independently for following each frame, wherein the ROI contains both target and background context and is cropped and propagated through the first CNN to obtain the first and second feature maps, and the selected first and second feature maps are propagated through the GNet and the SNet, respectively; and wherein two foreground heat maps are generated by the GNet and the SNet, respectively, and a target localization prediction is performed independently based on the two foreground heat maps.

In an embodiment, both GNet and SNet are initialized by:

feeding the selected first and second feature maps of the first frame through the GNet and SNet respectively to predict two target heat maps;

comparing the predicted heat maps with a ground truth heat map to obtain prediction errors;

back-propagating the errors through the GNet and SNet until the obtained errors are less than a threshold; and wherein the ground truth heat map is distributed in accordance with a 2-dimensional Gaussian distribution centered at the ground truth target location with variance proportional to a target size of the objects.

In an embodiment, the estimating further comprises:

sampling a set of target candidate regions according to a Gaussian distribution centered at the predicted target location in a last frame of the video sequences;

predicting a best target candidate in the first frame based on the target heat map estimated by the GNet, wherein the target confidence of each candidate is computed by a summation of heat map values within each of the candidate regions, and the candidate with the highest confidence is selected as the best target candidate, comparing the heat map values within a background region with those in the best candidate region to detect a distracter;

if no distracter is detected, the best target location predicted using the heat map from the GNet is determined as a final target location in the current frames, otherwise, a target localization using the specific heat map from the SNet will be utilized to predict the final target location.

In an embodiment, each of the GNet and SNet consists of a first convolutional layer and a second convolutional layer nonlinearly connected to the first convolutional layer, wherein the first convolutional layer has kernels of a relatively lager size and the second convolutional layer has kernels of a relatively smaller size.

In an embodiment, the method further comprises:
updating the SNet with previous tracking location for the objects in an online fashion to adapt to target appearance changes.

In a further aspect of the present application, disclosed is a system for object tracking, comprising:
a memory that stores executable instructions; and
a processor that executes the executable instructions to perform operations of the system, the operations comprising:
determining a region of interest (ROI) in a first frame of a video sequences, wherein the ROI is centered at aground truth target location for objects to be tracked; and
feeding the determined ROI forward through a first CNN (convolutional neural network) to obtain a plurality of first feature maps in a higher layer of the CNN and a plurality of second feature maps in a lower layer of the first CNN;
predicting, based on the first and the second feature maps, two target heat maps indicating a target location in the first frame, respectively; and
estimating a final target location for the ROI in the first frame, based on the two predicated heat maps.

In an embodiment, the first CNN is pre-trained on an image classification task such that the first feature maps include more semantic features to determine a category for objects to be tracked in the video sequence, while the second feature maps carry more discriminative information to separate the objects from distracters with similar appearance.

In an embodiment, the predicting of the two target heat maps is based on a plurality of feature maps selected from the first and second feature maps, wherein the plurality of feature maps from the first and second feature maps are selected by two sel-CNNs which are pre-trained with the first feature maps and the second feature maps respectively; and the training of the sel-CNNs comprises:
Initializing the two sel-CNNs with the first feature maps and the second feature maps, respectively, by inputting the two features maps into the two sel-CNNs respectively to output a heat map for the objects in each of the sel-CNNs; comparing the heat map with a ground truth heat map for the objects to obtain a prediction error in each of the sel-CNN; and back-propagating the error through the sel-CNNs until the obtained error is less than a threshold;
determining a significance for each of those in the first and second feature maps according to the two trained sel-CNNs;
ranking those in the first and second feature maps independently in a descending order according to their significance values; and selecting top ranked K feature maps from both higher and lower layers, wherein K is an integer greater than or equal to 1;

wherein at an online tracking stage for following frames, the first and second feature maps are extracted from the higher and lower layers of the first CNN respectively and their corresponding K features maps are selected and serve as said selected first and second feature maps.

In an embodiment, the predicting, based on the first and the second feature maps, two target heat maps indicating a target location in the current frame, respectively, comprises:
capturing, by a general network (GNet), the category information of a target object based on selected feature maps from the first feature maps; and
discriminating, by a specific network (SNet), the target object from background with similar appearance based on the selected second feature maps of the lower layer.

In an embodiment, the GNet and the SNet are initialized in the first frame to perform foreground heat map regression for the target object;
for a new frame, the ROI centered at a last target location contains both target and background context and is cropped and propagated through the first CNN such that two foreground heat maps are generated, by the GNet and the SNet, from the selected first feature maps from the higher layer of the first CNN and the selected second feature maps from the lower layer of the first CNN, respectively.

In an embodiment, both the GNet and the SNet are initialized by:
feeding the selected first and second feature maps of the first frame through the GNet and the SNet respectively to predict two target heat maps;
comparing the predicted heat maps with a ground truth heat map to obtain prediction errors;
back-propagating the errors through the GNet and the SNet until the obtained errors are less than a threshold; and
wherein the ground truth heat map is distributed in accordance with a 2-dimensional Gaussian centered at the ground truth target location with variance proportional to a target size of the objects.

In an embodiment, the estimating a final target location for the ROI in the current frame, based on the two predicated heat maps, comprises:
sampling a set of target candidate regions according to a Gaussian distribution centered at the predicted target location in a last frame of the video sequences;
predicting a best target candidate in the current frame based on the target heat map estimated by the GNet, wherein the target confidence of each candidate is computed by a summation of heat map values within each of the candidate regions, and the candidate with the highest confidence is selected as the best target candidate; and
comparing the heat map values within a background region with those in the best candidate region to detect a distracter;
if no distracter is detected, the best target location predicted using the heat map from the GNet is determined as a final target location in the current frames, otherwise, a target localization using the specific heat map from the SNet will be utilized to predict the final target location.

In an embodiment, the sel-CNNs consist of a dropout layer followed by a convolutional layer without any non-linear transformation.

In an embodiment, each of the GNet and SNet consists of a first convolutional layer and a second convolutional layer nonlinearly connected to the first convolutional layer, wherein the first convolutional layer has a lager convolutional kernels of size and the second convolutional layer has kernels with a relative small size.

In an embodiment, the operations further comprises:

updating the heat map prediction unit using previous tracking locations in an online fashion to adapt to target appearance changes.

In a further aspect of the present application, disclosed is a non-transitory computer readable storage medium for storing a computer readable instruction, wherein when the instruction is executed, an operation of each step in the method for object tracking according to claim 1 is implemented.

In a further aspect of the present application, disclosed is a non-transitory computer readable storage medium for storing a computer readable instruction, wherein when the instruction is executed, an operation is implemented, the operation comprising:

determining a region of interest (ROI) in a first frame of a video sequence, wherein the ROI is centered at aground truth target location for objects to be tracked; and feeding the determined ROI forward through a first CNN (convolutional neural network) to obtain a plurality of first feature maps in a higher layer of the CNN and a plurality of second feature maps in a lower layer of the first CNN;

predicting, based on the first and the second feature maps, two target heat maps indicating a target location in the first frame, respectively; and estimating a final target location for the ROI in the first frame, based on the two predicated heat maps.

BRIEF DESCRIPTION OF THE DRAWINGS

Exemplary non-limiting embodiments of the present invention are described below with reference to the attached drawings. The drawings are illustrative and generally not to an exact scale. The same or similar elements on different figures are referenced with the same reference numbers.

DETAILED DESCRIPTION

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the scope of the invention as defined by the appended claims. In the following description, numerous specific details are set forth in order to provide a thorough understanding of the present invention. The present invention may be practiced without some or all of these specific details. In other instances, well-known process operations have not been described in detail in order not to unnecessarily obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

CNN features at different levels/depths have different properties that fit the tracking problem. A top convolutional layer captures more abstract and high-level semantic features. They are strong at distinguishing objects of different classes and are very robust to deformation and occlusion. However, they are less discriminative to objects of the same category as shown by the examples. A lower layer provides more detailed local features which help to separate the target from distracters (e.g. other objects in the same class) with similar appearance. But they are less robust to dramatic change of appearance. Based on these observations, the present application is proposed to automatically switch the usage of these two layers during tracking depending on the occurrence of distracters.

the CNN features pre-trained on Image Net are for distinguishing generic objects. However, for a particular target, not all the features are useful for robust tracking. Some feature responses may serve as noise. It is hard to distinguish the target object from background if all the feature maps are used. In contrast, through proper feature selection, the noisy feature maps not related to the representation of the target are cleared out and the remaining ones can more accurately highlight the target and suppress responses from background. The present application proposes a principled method to select discriminative feature maps and discard noisy or unrelated ones for the tracking target.

The embodiments of the present application have at least one of the two advantages which significantly benefit tracking performance:

1) A principled feature selection method is utilized to automatically select discriminative feature maps of convolutional networks and discard noisy or unrelated ones for more accurate visual tracking.

2) Two convolutional layers of different levels are jointly considered so that they complement with each other. Specifically, a top layer encodes more semantic features and serves as a category detector, while a lower layer carries more discriminative information and can better separate the target from distracters with similar appearance.

Figure 1:
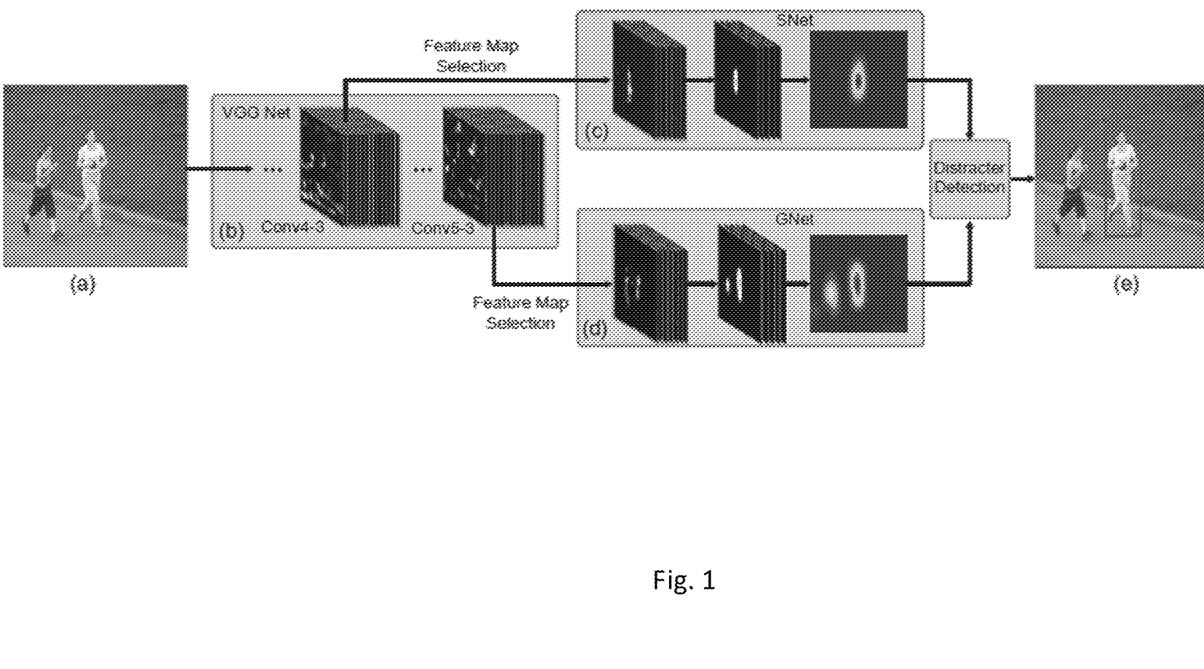
FIG. 1 is a schematic scenario illustrating the operation of the system according to one embodiment of the present application.

FIG. 1 is a schematic scenario illustrating the operation of the system for object tracking according to an embodiment of the present application. For a given target, a feature map selection method is performed on the a lower layers and a higher layer (for example, conv4-3 and conv5-3 layers, as shown) of the VGG network to select the most relevant feature maps and avoid over fitting on noisy ones. A general neural network (GNet) that captures the category information of the target is built on top of the selected feature maps of the higher layer (conv5-3 layer) of a fully convolutional network. A specific neural network (SNet) that discriminates the target from background with similar appearance is built on top of the selected feature maps of the lower (conv4-3) layer of the fully convolutional network. Both GNet and SNet are initialized in the first frame to perform foreground heat map regression for the target and adopt different online update strategies. For a new frame, a region of interest (ROI) centered at the last target location containing both target and background context is cropped and propagated through the fully convolutional network such that two foreground heat maps are generated, by the GNet and the SNet, from the selected first feature maps from the higher layer of the fully convolutional network and the selected second feature maps from the lower layer of the fully convolutional network, respectively.

The SNet and the GNet share the same network architecture that consists of two additional convolutional layers. The first additional convolutional layer has convolutional kernels of size (for example, 9×9) and outputs a plurality of (for example, 36) feature maps as the input to the next layer. The second additional convolutional layer has kernels with a relative small size (for example, 5×5) and outputs the foreground heat map of the input image. ReLU is chosen as the nonlinear function for these two layers. Target localization is performed independently based on the two heat maps. The final target is determined by a distracter detection scheme that decides which heat map to be used.

Figure 2:
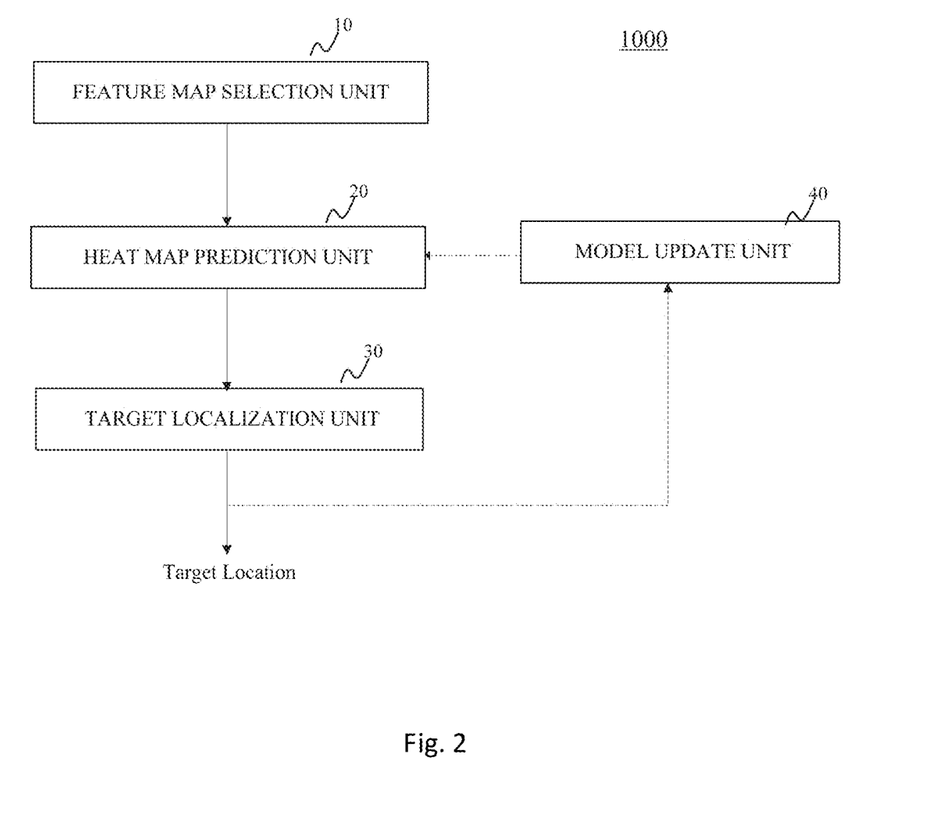
FIG. 2 is a schematic diagram illustrating a system for object tracking applicable to schematic scenario of FIG. 1 according to an embodiment of the present application.

FIG. 2 is a schematic diagram illustrating a system for object tracking applicable to schematic scenario of FIG. 1 according to an embodiment of the present application. As shown, the system 1000 for object tracking may comprise a feature map selection unit 10, a heat map prediction unit 20, and a target localization unit 30. Hereinafter, the feature map selection unit 10, a heat map prediction unit 20, and a target localization unit 30 will be further discussed, respectively.

The Feature Map Selection Unit 10

The feature map selection unit 10 operates to determine a region of interest (ROI) in a first frame of a video sequences, the ROI centered at a ground truth target location for the objects to be tracked, wherein the predetermined ground truth target location includes both the target region and background context for objects to be tracked, and feed each determined ROI forward through a first CNN (convolutional network), and obtains a plurality of first feature maps in a higher layer of the CNN and a plurality of second feature maps in a lower layer of the CNN; wherein the CNN is pre-trained on image classification task such the first feature maps include more semantic features to determine a category for objects to be tracked in the video sequences, while the second feature maps carry more discriminative information to separate the objects from distracters with similar appearance.

The feature map selection unit 10 is configured to initialize the two convolutional neural networks with the first feature maps and the second feature maps, respectively, by inputting the two features maps into the two CNNs respectively to output a predicted location for the object in each CNN, comparing the predicted location with a ground truth target location for the object to obtain a prediction error; back-propagating the error through the CNN until the obtained error is less than a threshold, and output a plurality of feature maps from each of the CNNs. Then the feature map selection unit 10 operates to determine the significance of each feature map on an objective function, rank all the feature maps in a descending order according to their significance values, select the top ranked K feature maps from both higher and lower layers, wherein at the online tracking stage for the following frame, the feature maps are extracted and the corresponding K features maps are selected from the extracted maps, as will be discussed as below.

As can be seen, the proposed feature map selection is based on a target heat map regression model through the first CNN, also named as sel-CNN, and is conducted independently on, for example, the conv4-3 and conv5-3 layers of VGG. The sel-CNN (the first CNN) consists of a dropout layer followed by a convolutional layer without any nonlinear transformation. It takes the feature maps (conv4-3 or con5-3) to be selected as input to predict the target heat map M, which is a 2-dimensional Gaussian centered at the ground truth target location with variance proportional to the target size. The sel-CNN is trained by minimizing the square loss between the predicted foreground heat map $\hat{M}$ and the target heat map M:

$$L_{sel} = \|\hat{M} - M\|^2 \tag{1}$$

After parameter learning using back-propagation converges, the sel-CNN parameters are fixed and the feature maps are selected according to their impacts on the loss function. The input feature maps F are vectorized into a vector denoted by vec(F). Denote $f_i$ as the i-th element of vec(F). The change of the loss function caused by the perturbation of the feature map δF can be computed by a two-order Taylor expansion as follows:

$$\delta L_{sel} = \sum_i g_i \delta f_i + \frac{1}{2} \sum_i h_{ii} (\delta f_i)^2 + \frac{1}{2} \sum_{i \neq j} h_{ij} \delta f_i \delta f_j \tag{2}$$

where $$g_i = \frac{\partial L_{sel}}{\partial f_i} \text{ and } h_{ij} = \frac{\partial^2 L_{sel}}{\partial f_i \partial f_j}$$

are, respectively, the first and second order derivatives of the objective function with respect to the input feature maps. The number of elements in the feature maps is very large, for example, it will be more than 270,000 in some instances. The complexity for computing all the second order derivatives $h_{ij}$ is $O(270,000^2)$, which is too time consuming. Accordingly, in the present embodiment, the Hessian matrix with a diagonal matrix is approximated, in which the third term of the right hand side of formula (2) is neglected. Both the first derivatives $g_i$ and the second derivatives $h_{ii}$ can be efficiently computed via back-propagation.

The significance of the element $f_i$ is defined as the change of the objective function after setting $f_i$ to zero, i.e., $\delta f_i = 0 - f_i$. According to formula (2), the significance of $f_i$ can then be computed as $$s_i = -g_i f_i + \frac{1}{2} h_{ii} (f_i)^2 \tag{3}$$

The significance of the k-th feature map is further defined as the summation of significance of all its elements $$S_k = \sum_{x,y} s(x, y, k) \quad (4)$$

where s(x, y, k) is the significance of the element indexed by location (x, y) on the k-th feature map. All the feature maps are sorted in the descending order by their significance, and the top K feature maps are selected for the current tracking task. These selected feature maps have significant impact on the objective function and thus are most relevant to the tracking task. Our feature map selection method can be conducted in an online fashion. In our experiments, we only conduct feature selection at the first frame and have achieved good performance. This should be partially attributed to the robustness of CNN features.

The idea of using quadratic approximation of the cost function to remove some connections in neural network scan be traced back to year of 1989. The aim was to reduce the number of parameters and improve speed, while the present application targets on removing noisy feature maps and improving tracking accuracy.

The Heat Map Prediction Unit 20

The heat map prediction unit 20 receives the first and the second feature maps to predict, based on the received features maps, two target heat maps indicating the target location in the current frame, respectively. According to one embodiment of the present application, the heat map prediction unit 20 is configured with a general network and a specific network, wherein the general network (GNet) captures the category information of the target object based on top of the selected feature maps from the first feature maps; and the specific network (SNet) discriminates the target object from background with similar appearance based on top of the selected second feature maps of the conv4-3 layer. As discussed in the above, the SNet and The GNet share the same network architecture that consists of two additional convolutional layers. The first additional convolutional layer has convolutional kernels of size (for example, 9×9) and outputs a plurality of (for example, 36) feature maps as the input to the next layer. The second additional convolutional layer has kernels with a relative small size (for example, 5×5) and outputs the foreground heat map of the input image. ReLU is chosen as the nonlinear function for these two layers.

Both GNet and SNet are initialized in the first frame to perform foreground heat map regression for the target object. The SNet and the GNet are initialized in the first frame by minimizing the following square loss function:

$$L = L_S + L_G$$

$$L_U = \|\hat{M}_U - M\|_F^2 + \beta \|W_U\|_F^2 \quad (5)$$

where the subscript U∈{S, G} indicates SNet and GNet, respectively; $\hat{M}_U$ represents the foreground heat map predicted by the network; M is the target heat map, $W_U$ is the weight parameter of the convolutional layers; β is a tradeoff parameter for weight decay.

Note that the sel-CNN for selecting features and the SNet and GNet for localization are different in CNN structures. The sel-CNN architecture is very simple to avoid using noisy feature maps to over fit the objective function, whereas the SNet and GNet are more complex. Since the noisy feature maps have been discarded by the feature map selection, more complex model facilitates more accurate tracking.

For a new frame, a region of interest (ROI) centered at the last target location containing both target and background context is cropped and propagated through the fully convolutional network such that two foreground heat maps are generated by the GNet and the SNet, respectively, such that two foreground heat maps are generated, by the GNet and the SNet, from the first selected feature maps from the higher layer of the CNN and the selected second feature maps from the lower layer of the first CNN, respectively, and target localization is performed independently based on the two heat maps, as will be further discussed below.

In one embodiment of the present application, the target localization is first performed on the heat map produced by GNet. Denote the target location as $\hat{X}=(x, y, \sigma)$, where x, y and σ represent the center coordinates and scale of the target bounding box, respectively. Given the target location $\hat{X}^{t-1}$ in the last frame, it assumes the locations of target candidates in the current frame are subject to a Gaussian distribution $$p(X^t|\hat{X}^{t-1}) = N(X^t; \hat{X}^{t-1}, \Sigma) \quad (6)$$

where Σ is a diagonal covariance matrix that indicates the variances of the location parameters. The confidence of the i-th candidate is computed as the summation of all the heat map values within the candidate region.

$$conf_i = \sum_{j \in R_i} \hat{M}_G(j) \quad (7)$$

where $\hat{M}_G$ denotes the heat map generated by GNet; $R_i$ is the region of the i-th target candidate according to its location parameter $X_i^t$; j denotes the coordinate index. The candidate with the highest confidence is predicted as the target by GNet.

The Target Localization Unit 30

The target localization unit 30, based on the two predicated heat maps, estimates the target location in the current frame via a distracter detection mechanism.

As discussed, GNet based on the higher layer (for example, conv5-3 layer) captures semantic features and is highly invariant to intra class variation. Hence, the foreground heat map generated by GNet highlights both the target and background distracters with similar appearances.

To prevent the tracker from drifting to background, the present application further promotes a distracter detection to determine the final target location. Denote the target location predicted by GNet as $\hat{X}_G$, the corresponding target region in the heat map as $R_G$. The probability of background distracter is evaluated by the proportion between the confidence values outside and inside the target region $$P_d = \frac{\sum_{j \in \hat{M}_G - R_G} \hat{M}_G(j)}{\sum_{k \in R_G} \hat{M}_G(k)} \quad (8)$$

where $\hat{M}_G - R_G$ represents the background region on the predicted heat map $\hat{M}_G$. When the proportion $P_d$ is less than a predefined threshold (0.2 in all the experiments), it assume no background distracter appears and use the target location predicted by GNet as the final result. Otherwise, the same target localization procedure described above is performed on the heat map predicted by the SNet, and the candidate with the highest confidence is labeled as the target.

Returning to the target localization unit 30 according to one embodiment of the present application, it is configured to sample a set of target candidate regions according to a Gaussian distribution centered at the predicted target location in the last frame of the video sequences; predict a best target candidate in the current frame based on the target heat map estimated by the GNet, wherein the target confidence of each candidate is computed by a summation of heat map values within each of the candidate regions, and the candidate with the highest confidence is selected as the best target candidate; and compare the heat map values within a background region with those in the best candidate region to detect a distracter. If no distracter is detected, the best target location predicted using the heat map from the GNet as a final target location in the current frames, otherwise, a target localization using the specific heat map from the SNet will be utilized to predict the final target location.

The Update Unit 40

The update unit 40 updates the heat map prediction unit using previous tracking results in an online fashion to adapt to target appearance changes.

In order to avoid the background noise introduced by online update, the present application is proposed to fix GNet and only update SNet after the initialization in the first frame. SNet is updated following two different rules: the adaptation rule and the discrimination rule, which aim to adapt SNet to target appearance variation and improve the discriminative power for foreground and background, respectively. According to the adaptation rule, we fine-tune SNet every predetermined number of (for example, 20) frames using the most confident (for example, 10) tracking result within these predetermined number of frames. Based on the discrimination rule, when distracters are detected, SNet is further updated using the tracking results in the first frame and the current frame by minimizing the following objective function:

$$\min\beta\|W_S\| + \sum_{x,y}\left\{[\hat{M}_S^1(x,y)-M^1(x,y)]^2 + [1-\Phi^t(x,y)][\hat{M}_S^t(x,y)-M^t(x,y)]^2\right\} \quad (9)$$

where $W_S$ denotes the convolutional weight of SNet; (x, y) are spatial coordinates; $\hat{M}_S^t$ and $M^t$ represent the heat map for the t-th frame predicted by SNet and the heat map generated according to the predicted target location (a 2-dimensional Gaussian centered at the target location), respectively. The foreground mask $\Phi^t$ indicates the predicted target bounding box, i.e., $\Phi^t(x, y)=1$ if the location (x, y) belongs to the target region, and $\Phi^t(x, y)=0$, otherwise.

The second term in formula (9) corresponds to loss for locating the target object in the first frame. When distracters appear or the target undergoes severe occlusion, the estimated target region is not reliable for learning the appearance. Therefore, it chooses a conservative scheme in adding the first frame for supervising the learning so that the learned model still has the appearance in the first frame considered. The estimated target region is not used for updating the model because it is not reliable. Therefore, the third term in formula (9) removes the loss for the target region and only considers loss for the background region in the t-th frame. It enforces the model to put more efforts on assigning the background distracters as background. The combination of the second term and the third term in formula (9) can help SNet to better separate the target from background and alleviate the model degradation caused by occlusion or distracters.

Figure 3:
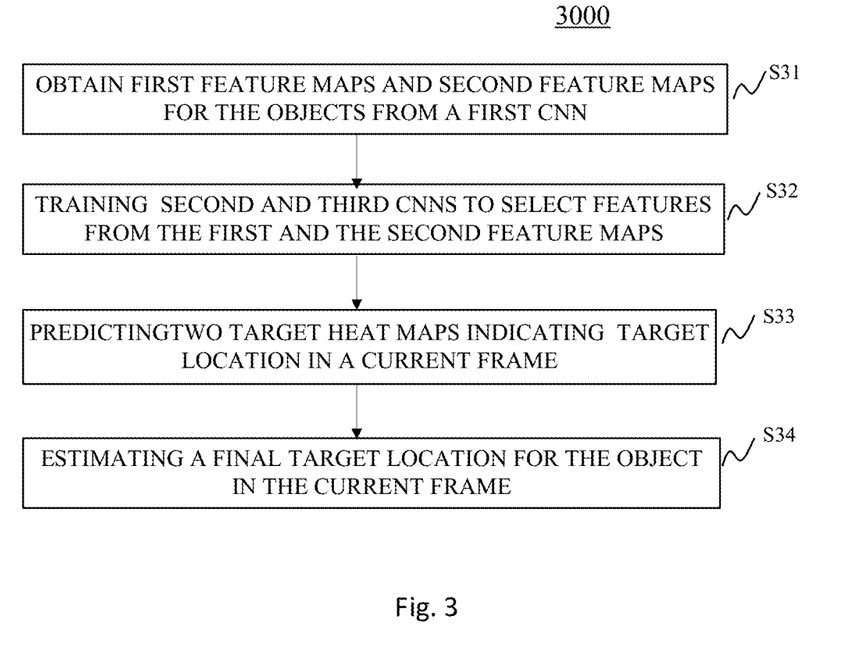
FIG. 3 is a schematic diagram illustrating a flow chart for a method for object tracking according to one embodiment of the present application.

Hereinafter, a method 3000 for object tracking according to one embodiment of the present application will be discussed in reference to FIG. 3. As shown, at step s31, a first frame of a video sequences is fed forward through a first CNN (convolutional network) to obtain a plurality of first feature maps for objects to be tracked in a higher layer of the CNN and a plurality of second feature maps for the objects in a lower layer of the first CNN. In particular, a region of interest (ROI) in a first frame of a video sequences will be determined (the ROI centered at the target location includes both the target region and background context) and the determined ROI is then fed forward through the first CNN to obtain a plurality of first feature maps for objects to be tracked in a higher layer of the CNN and a plurality of second feature maps for the objects in a lower layer of the first CNN.

At step S32, the method trains a second CNN and a third CNN (sel-CNNs) with the first feature maps and the second feature maps, respectively, to select a plurality of feature maps from the first and second feature maps, respectively. In particular, the first CNN is pre-trained on image classification task such that the first feature maps include more semantic features to determine a category for objects to be tracked in the video sequences, while the second feature maps carry more discriminative information to separate the objects from distracters with similar appearance.

Figure 4:
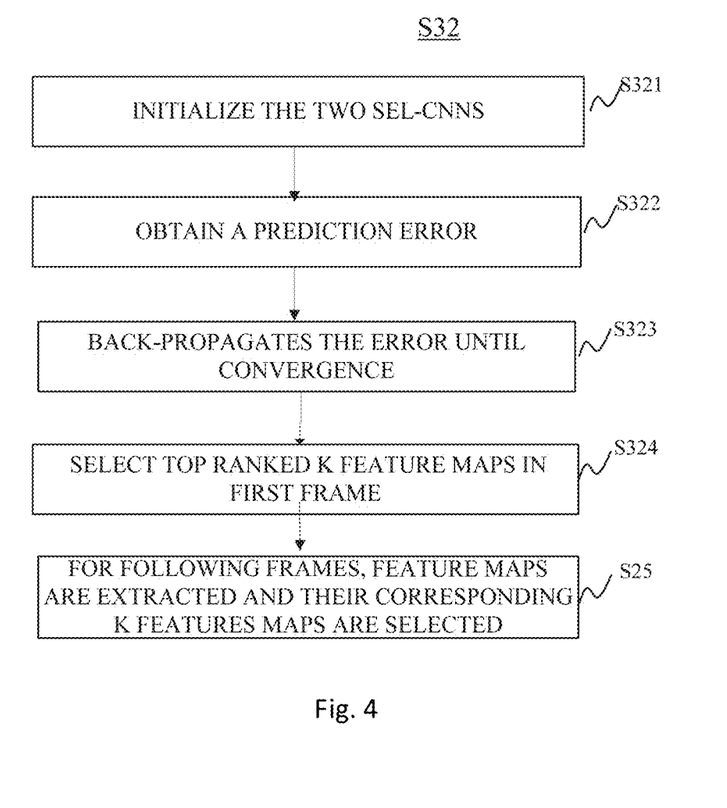
FIG. 4 is a schematic diagram illustrating a flow chart for the training step S32 according to one embodiment of the present application.

FIG. 4 is a schematic diagram illustrating a flow chart for the training S32 according to one embodiment of the present application. As shown, the training further comprises a step S321 of initializing the two sel-CNNs with the first feature maps and the second feature maps, respectively, with the two features maps respectively to output a predicted location for the objects in each sel-CNNs. At step S322, the predicted location is compared with a ground truth target location for the objects to obtain a prediction error, and step s323, it back-propagates the error through the sel-CNNs until the obtained error is less than a threshold.

At step S324, it determines a significance of each of the feature maps outputted from each of the two sel-CNNs, and all the feature maps are ranked in a descending order according to their significance values, wherein top ranked K feature maps from both higher and lower layers will be selected, wherein K is an integer greater than or equal to 1.

At step S325, at the online tracking stage for following frames, the feature maps are extracted and their corresponding K features maps are selected from the extracted maps as the first and the second feature maps.

Figure 5:
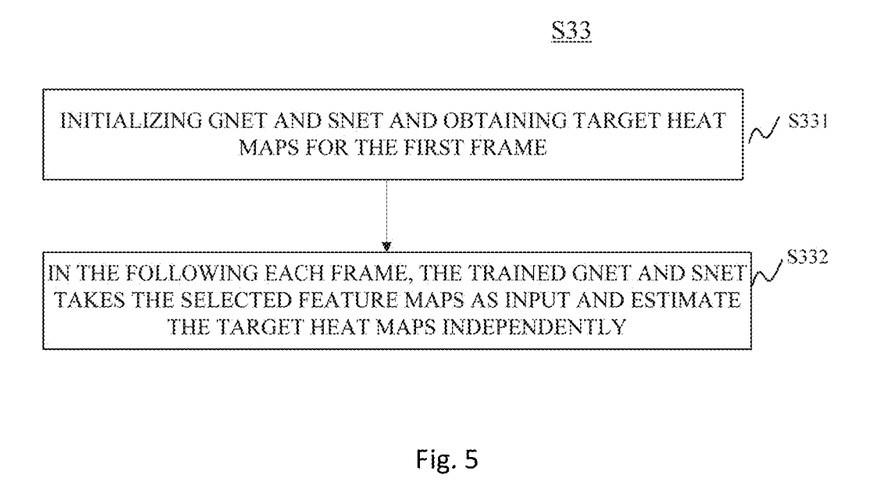
FIG. 5 is a schematic diagram illustrating a flow chart for the predicting step S33 according to one embodiment of the present application.

Returning to FIG. 3, the method 3000 further comprises a step S33 of predicting, based on the first and the second feature maps, two target heat maps indicating the target location in a current frame, respectively, by the trained second CNN and a third CNN. FIG. 5 is a schematic diagram illustrating a flow chart for the step S33 of predicting according to one embodiment of the present application. As shown, in step S501, GNet and SNet are initialized by inputting the two features maps into the two CNNs respectively to output a heat map for the objects in each sel-CNNs; comparing the heat map with a ground truth heat map for the objects to obtain a prediction error; and back-propagating the error through the sel-CNNs until the obtained error is less than a threshold, and target heat maps for the first frame will be obtained. Then, at step S502, the initialized GNet and SNet estimate the target heat maps independently for following each frame, wherein a region of interest (ROI) centered at the last target location contains both target and background context and is cropped and propagated the CNN such that two foreground heat maps are generated, by the GNet and the SNet, from the selected first feature maps from the higher layer of the CNN and the selected second feature maps from the lower layer of the first CNN, respectively, and target localization is performed independently based on the two heat maps. In one embodiment of the present application, each of the GNet and SNet consists of a first convolutional layer and a second convolutional layer nonlinearly connected to the first layer, wherein the first convolutional layer has a larger convolutional kernel of size and the second convolutional layer has kernels with a relative small size.

Figure 6:
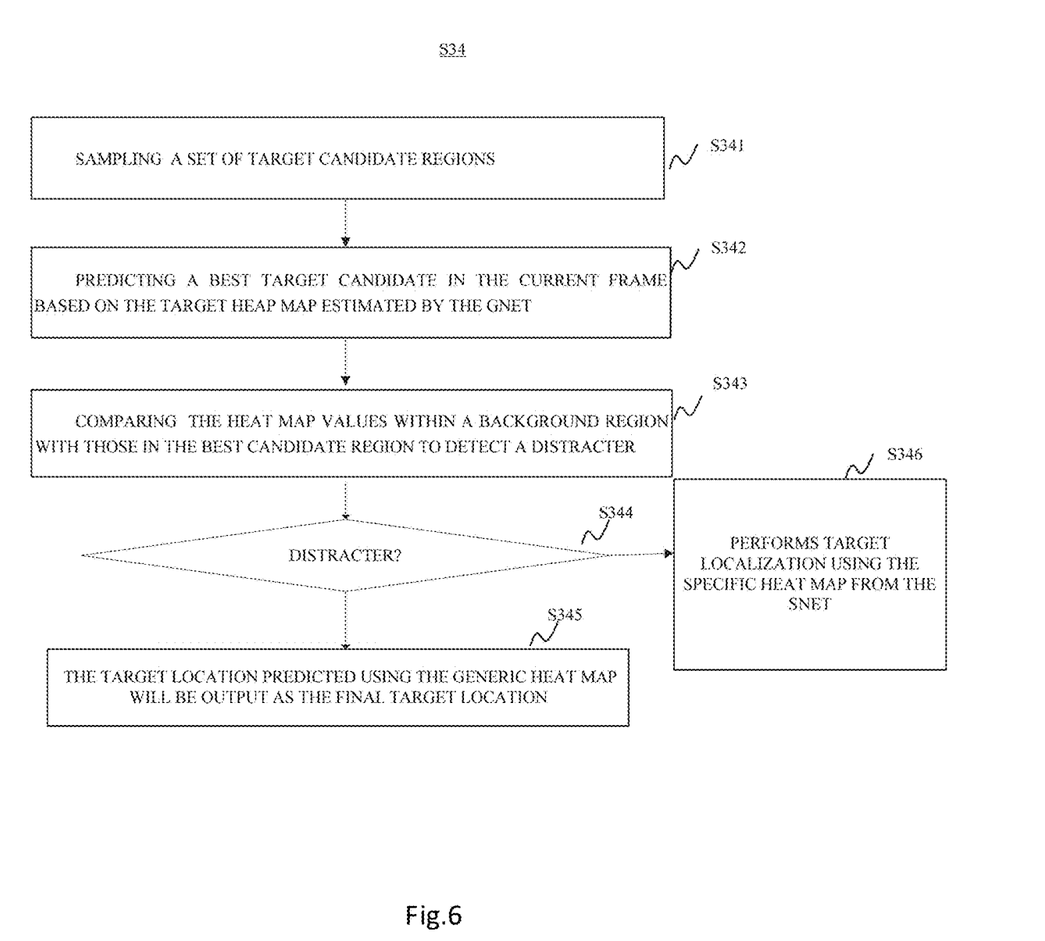
FIG. 6 is a schematic diagram illustrating a flow chart for the predicting step S34 according to one embodiment of the present application.

Returning to FIG. 3 again, the method 3000 further comprises a step S34, in which, a target location for the object will be estimated based on the two predicated heat maps in the current frame. In one embodiment of the present application, the step S34 may comprise as shown in FIG. 6:

step S341: sampling a set of target candidate regions according to a Gaussian distribution centered at the predicted target location in the last frame of the video sequences;

step S342: predicting a best target candidate in the current frame based on the target heat map estimated by the GNet, wherein the target confidence of each candidate is computed by a summation of heat map values within each of the candidate region, and the candidate with the highest confidence is selected as the best target candidate;

step S343: compare the heat map values within a background region with those in the best candidate region to detect a distracter;

step S344: it is determined if the distracter is detected. If no distracter is detected, at step S345 the best target location predicted using the heat map from the GNet is determined as a final target location in the current frames at step S345, otherwise, a target localization using the specific heat map from the SNet will be utilized to predict the final target location at step S346.

Figure 7:
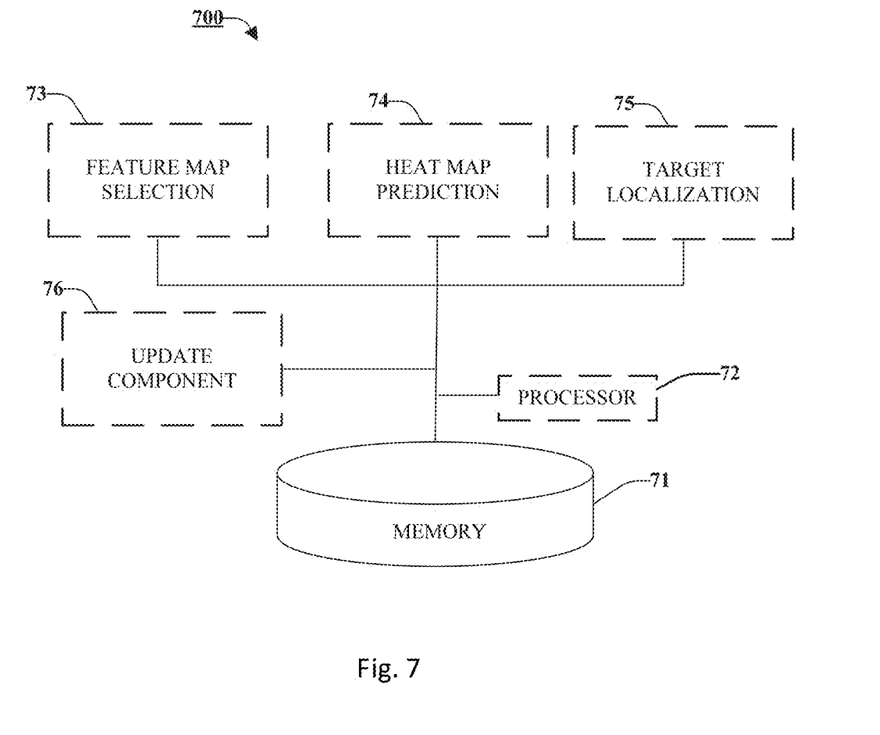
FIG. 7 illustrates a system for object tracking consistent with an embodiment of the present application.

FIG. 7 illustrates a system 700 for object tracking consistent with an embodiment of the present application. In this embodiment, the process as shown in FIG. 3 can be implemented by software in the system 700. Referring to FIG. 7, the system 700 comprises a memory 71 that stores executable components and a processor 72, electrically coupled to the memory 71 to execute the executable components to perform operations of the system 700. The executable components may comprise: a feature map selection component 73 configured to determine a region of interest (ROI) in a first frame of a video sequences, the ROI including pixels for objects to be tracked, and feed the determined ROI forward through a first CNN (convolutional network), and obtain a plurality of first feature maps in a higher layer of the CNN and a plurality of second feature maps in a lower layer of the first CNN; a heat map prediction component 74 configured to predict, based on the first and the second feature maps, two target heat maps indicating a target location in the current frame, respectively; and a target localization component 75 configured to, based on the two predicated heat maps, estimate a final target location for the ROI in the current frame.

As discussed in the above, the first CNN may be pre-trained on image classification task such that the first feature maps include more semantic features to determine a category for objects to be tracked in the video sequences, while the second feature maps carry more discriminative information to separate the objects from distracters with similar appearance.

The same as the feature map selection unit as discussed in the above, the feature map selection component is configured with two convolutional neural networks (i.e., sel-CNNs), and wherein the feature map selection unit is configured to, initialize the two sel-CNNs with the first feature maps and the second feature maps, respectively, by inputting the two features maps into the two CNNs respectively to output a heat map for the objects in each sel-CNNs; comparing the heat map with a ground truth heat map for the objects to obtain a prediction error; and back-propagating the error through the sel-CNNs until the obtained error is less than a threshold; determine a significance for each of those in the first and second feature maps according to the two trained sel-CNNs) rank those in the first and second feature maps independently in a descending order according to their significance values; and select top ranked K feature maps from both higher and lower layers, wherein K is an integer greater than or equal to 1; wherein at an online tracking stage for following frames, the first and second feature maps are extracted from the higher and lower layers of the first CNN respectively and their corresponding K features maps are selected and serve as said selected first and second feature maps.

In one embodiment, the heat map prediction component is configured with a general network and a specific network, wherein the general neural network (GNet) captures the category information of the target object based on top of the selected feature maps from the first feature maps; the specific neural network (SNet) discriminates the target object from background with similar appearance based on top of the selected second feature maps of the lower layer. The GNet and the SNet are initialized in the first frame to perform foreground heat map regression for the target object; for a new frame, a region of interest (ROI) centered at a last target location containing both target and background context is cropped and propagated through the fully convolutional network; and two foreground heat maps are generated by the GNet and the SNet, respectively.

Both GNet and SNet are initialized by following steps: feeding the selected first and second feature maps of the first frame through the GNet and SNet respectively to predict two target heat maps; comparing the predicted heat maps with a ground truth heat map to obtain prediction errors; back-propagating the errors through the GNet and SNet until the obtained errors are less than a threshold; and wherein the ground truth heat map is distributed in accordance with a 2-dimensional Gaussian distribution centered at the ground truth target location with variance proportional to a target size of the objects.

As discussed in reference with the target localization unit, the target localization component is configured to, sample a set of target candidate regions according to a Gaussian distribution centered at the predicted target location in the last frame of the video sequences; predict a best target candidate in the current frame based on the target heat map estimated by the GNet, wherein the target confidence of each candidate is computed by a summation of heat map values within each of the candidate regions, and the candidate with the highest confidence is selected as the best target candidate; and compare the heat map values within a background region with those in the best candidate region to detect a distracter; if no distracter is detected, the best target location predicted using the heat map from the GNet is determined as a final target location in the current frames, otherwise, a target localization using the specific heat map from the SNet will be utilized to predict the final target location.

The first CNN consists of a dropout layer followed by a convolutional layer without any nonlinear transformation. Each of the GNet and SNet consists of a first convolutional layer and a second convolutional layer nonlinearly connected to the first layer, wherein the first convolutional layer has a lager convolutional kernel of size and the second convolutional layer has kernels with a relative small size.

As shown, the system 700 may further comprise an update component 76 configured to update the heat map prediction unit using previous tracking locations in an online fashion to adapt to target appearance changes.

As will be appreciated by one skilled in the art, the present invention may be embodied as a system, method or computer program product. Accordingly, the present invention may take the form of an entirely hardware embodiment and hardware aspects that may all generally be referred to herein as a "unit", "circuit," "module" or "system." Much of the inventive functionality and many of the inventive principles when implemented, are best supported with or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Although the preferred examples of the present invention have been described, those skilled in the art can make variations or modifications to these examples upon knowing the basic inventive concept. The appended claims are intended to be considered as comprising the preferred examples and all the variations or modifications fell into the scope of the present invention.

Obviously, those skilled in the art can make variations or modifications to the present invention without departing the scope of the present invention. As such, if these variations or modifications belong to the scope of the claims and equivalent technique, they may also fall into the scope of the present invention.

What is claimed is:

1. A method for object tracking, comprising:
    determining a region of interest (ROI) in a first frame of a video sequence, wherein the ROI is centered at a ground truth target location for objects to be tracked;
    feeding the determined ROI forward through a first CNN (convolutional neural network) to obtain a plurality of first feature maps in a higher layer of the CNN and a plurality of second feature maps in a lower layer of the first CNN, wherein the first CNN is pre-trained on an image classification task such that the first feature maps include more semantic features to determine a category for objects to be tracked in the video sequence, while the second feature maps carry more discriminative information to separate the objects from distracters with similar appearance;
    selecting a plurality of feature maps from the first and second feature maps, respectively;
    predicting, based on the selected first and second feature maps, two target heat maps indicating a target location for said objects in the first frame, respectively; and
    estimating, based on the two predicated target heat maps, a final target location for the object in the first frame.

2. The method according to claim 1, wherein the plurality of feature maps from the first and second feature maps are selected by two sel-CNNs which are pre-trained with the first feature maps and the second maps respectively; and the training of the sel-CNNs comprises:
    initializing the two sel-CNNs with the first feature maps and the second feature maps, respectively, to output a heat map for the objects in each of the sel-CNNs;
    comparing the heat map with a ground truth heat map for the objects to obtain a prediction error for each of the sel-CNNs; and
    back-propagating the error through each of the sel-CNNs until the obtained error is less than a threshold.

3. The method according to claim 2, wherein the training further comprises:
    determining a significance for each of those in the first and second feature maps according to the two trained sel-CNNs;
    ranking those in the first and second feature maps independently in a descending order according to their significance values; and
    selecting top ranked K feature maps from both higher and lower layers, wherein K is an integer greater than or equal to 1;
    wherein at an online tracking stage for following frames, the first and second feature maps are extracted from the higher and lower layers of the first CNN respectively and their corresponding K features maps are selected and serve as said selected first and second feature maps.

4. The method according to claim 1, wherein the predicting comprises:
    initializing a GNet and a SNet and obtaining target heat maps for the first frame;
    estimating, by the initialized GNet and SNet, the target heat maps independently for following each frame,
    wherein the ROI contains both target and background context and is cropped and propagated through the first CNN to obtain the first and second feature maps, and the selected first and second feature maps are propagated through the GNet and the SNet, respectively; and
    wherein two foreground heat maps are generated by the GNet and the SNet, respectively, and a target localization prediction is performed independently based on the two foreground heat maps.

5. The method according to claim 4, wherein both GNet and SNet are initialized by:
    feeding the selected first and second feature maps of the first frame through the GNet and SNet respectively to predict two target heat maps;
    comparing the predicted heat maps with a ground truth heat map to obtain prediction errors;
    back-propagating the errors through the GNet and SNet until the obtained errors are less than a threshold; and
    wherein the ground truth heat map is distributed in accordance with a 2-dimensional Gaussian distribution centered at the ground truth target location with variance proportional to a target size of the objects.

6. The method according to claim 5, wherein the estimating further comprises:
sampling a set of target candidate regions according to a Gaussian distribution centered at the predicted target location in a last frame of the video sequences;
predicting a best target candidate in the first frame based on the target heat map estimated by the GNet, wherein the target confidence of each candidate is computed by a summation of heat map values within each of the candidate regions, and the candidate with the highest confidence is selected as the best target candidate,
comparing the heat map values within a background region with those in the best candidate region to detect a distracter;
if no distracter is detected, the best target location predicted using the heat map from the GNet is determined as a final target location in the current frames, otherwise, a target localization using the specific heat map from the SNet will be utilized to predict the final target location.

7. The method according to claim 4, wherein each of the GNet and SNet consists of a first convolutional layer and a second convolutional layer nonlinearly connected to the first convolutional layer,
wherein the first convolutional layer has kernels of a relatively larger size and the second convolutional layer has kernels of a relatively smaller size.

8. The method according to claim 4, further comprising:
updating the SNet with previous tracking location for the objects in an online fashion to adapt to target appearance changes.

9. A non-transitory computer readable storage medium for storing a computer readable instruction, wherein when the instruction is executed, an operation of each step in the method for object tracking according to claim 1 is implemented.

10. A system for object tracking, comprising:
a memory that stores executable instructions; and
a processor that executes the executable instructions to perform operations of the system, the operations comprising:
determining a region of interest (ROI) in a first frame of a video sequence, wherein the ROI is centered at a ground truth target location for objects to be tracked; and
feeding the determined ROI forward through a first CNN (convolutional neural network) to obtain a plurality of first feature maps in a higher layer of the CNN and a plurality of second feature maps in a lower layer of the first CNN;
predicting, based on the first and the second feature maps, two target heat maps indicating a target location in the first frame, respectively; and
estimating a final target location for the ROI in the first frame, based on the two predicated heat maps.

11. The system according to claim 10, wherein the first CNN is pre-trained on an image classification task such that the first feature maps include more semantic features to determine a category for objects to be tracked in the video sequence, while the second feature maps carry more discriminative information to separate the objects from distracters with similar appearance.

12. The system according to claim 11, wherein the predicting of the two target heat maps is based on a plurality of feature maps selected from the first and second feature maps, wherein the plurality of feature maps from the first and second feature maps are selected by two sel-CNNs which are pre-trained with the first feature maps and the second feature maps respectively; and the training of the sel-CNNs comprises:
initializing the two sel-CNNs with the first feature maps and the second feature maps, respectively, by inputting the two features maps into the two sel-CNNs respectively to output a heat map for the objects in each of the sel-CNNs; comparing the heat map with a ground truth heat map for the objects to obtain a prediction error in each of the sel-CNN; and back-propagating the error through the sel-CNNs until the obtained error is less than a threshold;
determining a significance for each of those in the first and second feature maps according to the two trained sel-CNNs;
ranking those in the first and second feature maps independently in a descending order according to their significance values; and
selecting top ranked K feature maps from both higher and lower layers, wherein K is an integer greater than or equal to 1;
wherein at an online tracking stage for following frames, the first and second feature maps are extracted from the higher and lower layers of the first CNN respectively and their corresponding K features maps are selected and serve as said selected first and second feature maps.

13. The system according to claim 10, wherein the predicting, based on the first and the second feature maps, two target heat maps indicating a target location in the current frame, respectively, comprises:
capturing, by a general network (GNet), the category information of a target object based on selected feature maps from the first feature maps; and
discriminating, by a specific network (SNet), the target object from background with similar appearance based on the selected second feature maps of the lower layer.

14. The system according to claim 13, wherein, the GNet and the SNet are initialized in the first frame to perform foreground heat map regression for the target object;
for a new frame, the ROI centered at a last target location contains both target and background context and is cropped and propagated through the first CNN such that two foreground heat maps are generated, by the GNet and the SNet, from the selected first feature maps from the higher layer of the first CNN and the selected second feature maps from the lower layer of the first CNN, respectively.

15. The system according to claim 14, wherein both the GNet and the SNet are initialized by:
feeding the selected first and second feature maps of the first frame through the GNet and the SNet respectively to predict two target heat maps;
comparing the predicted heat maps with a ground truth heat map to obtain prediction errors;
back-propagating the errors through the GNet and the SNet until the obtained errors are less than a threshold; and
wherein the ground truth heat map is distributed in accordance with a 2-dimensional Gaussian centered at the ground truth target location with variance proportional to a target size of the objects.

16. The system according to claim 14, wherein the estimating a final target location for the ROI in the current frame, based on the two predicated heat maps, comprises:
sampling a set of target candidate regions according to a Gaussian distribution centered at the predicted target location in a last frame of the video sequences;

predicting a best target candidate in the current frame based on the target heat map estimated by the GNet, wherein the target confidence of each candidate is computed by a summation of heat map values within each of the candidate regions, and the candidate with the highest confidence is selected as the best target candidate; and comparing the heat map values within a background region with those in the best candidate region to detect a distracter;

if no distracter is detected, the best target location predicted using the heat map from the GNet is determined as a final target location in the current frames, otherwise, a target localization using the specific heat map from the SNet will be utilized to predict the final target location.

17. The system according to claim 12, wherein the sel-CNNs consist of a dropout layer followed by a convolutional layer without any nonlinear transformation.

18. The system according to claim 10, wherein each of the GNet and SNet consists of a first convolutional layer and a second convolutional layer nonlinearly connected to the first convolutional layer, wherein the first convolutional layer has a lager convolutional kernels of size and the second convolutional layer has kernels with a relative small size.

19. A non-transitory computer readable storage medium for storing a computer readable instruction, wherein when the instruction is executed, an operation is implemented, the operation comprising:

determining a region of interest (ROI) in a first frame of a video sequence, wherein the ROI is centered at a ground truth target location for objects to be tracked; and feeding the determined ROI forward through a first CNN (convolutional neural network) to obtain a plurality of first feature maps in a higher layer of the CNN and a plurality of second feature maps in a lower layer of the first CNN;

predicting, based on the first and the second feature maps, two target heat maps indicating a target location in the first frame, respectively; and estimating a final target location for the ROI in the first frame, based on the two predicated heat maps.

* * * * *